United States Patent
Dudar

(10) Patent No.: US 10,794,312 B2
(45) Date of Patent: Oct. 6, 2020

(54) SYSTEMS AND METHODS FOR CONTROLLING FUEL VAPOR CANISTER PURGING OPERATIONS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/239,440

(22) Filed: Jan. 3, 2019

(65) Prior Publication Data

US 2020/0217260 A1    Jul. 9, 2020

(51) Int. Cl.
  *F02M 33/00* (2006.01)
  *F02D 41/04* (2006.01)
  *F02D 41/00* (2006.01)

(52) U.S. Cl.
  CPC ......... *F02D 41/047* (2013.01); *F02D 41/004* (2013.01); *F02D 41/0087* (2013.01); *F02D 2250/41* (2013.01)

(58) Field of Classification Search
  CPC .. F02D 41/047; F02D 41/0087; F02D 41/004; F02D 2250/41
  USPC ......... 701/103–105, 107, 112, 113; 123/457, 123/479, 480, 481, 518, 520, 198 F
  See application file for complete search history.

(56) References Cited

U.S. PATENT DOCUMENTS

| | | | |
|---|---|---|---|
| 6,857,264 B2 | 2/2005 | Ament | |
| 8,312,765 B2 | 11/2012 | Pursifull et al. | |
| 8,333,063 B2 | 12/2012 | Elwart et al. | |
| 8,443,787 B2 | 5/2013 | Schondorf et al. | |
| 8,919,097 B2 | 12/2014 | Kerns et al. | |
| 9,163,571 B2 | 10/2015 | Dudar et al. | |
| 9,222,443 B2 * | 12/2015 | Peters | F02M 25/08 |
| 9,599,072 B2 | 3/2017 | Dudar | |
| 10,167,823 B2 * | 1/2019 | Dudar | F02M 25/0836 |
| 2017/0218885 A1 | 8/2017 | Dudar | |

* cited by examiner

*Primary Examiner* — Hai H Huynh
(74) *Attorney, Agent, or Firm* — Geoffrey Brumbaugh; McCoy Russell LLP

(57) ABSTRACT

Methods and systems are provided for increasing an efficiency of a purging operation of a fuel vapor storage canister of a vehicle, the fuel vapor storage canister configured to capture and store fuel vapors stemming from a fuel tank of the vehicle. As one example, a method comprises reactivating one or more cylinders of an engine during a purging operation, in response to an indication that the purging of stored fuel vapors from the fuel vapor storage canister is compromised as a result of fuel vaporization stemming from the fuel tank. In this way, the canister may be effectively cleaned even under high fuel vaporization circumstances, which may improve fuel economy and may reduce release of undesired evaporative emissions to atmosphere.

20 Claims, 6 Drawing Sheets

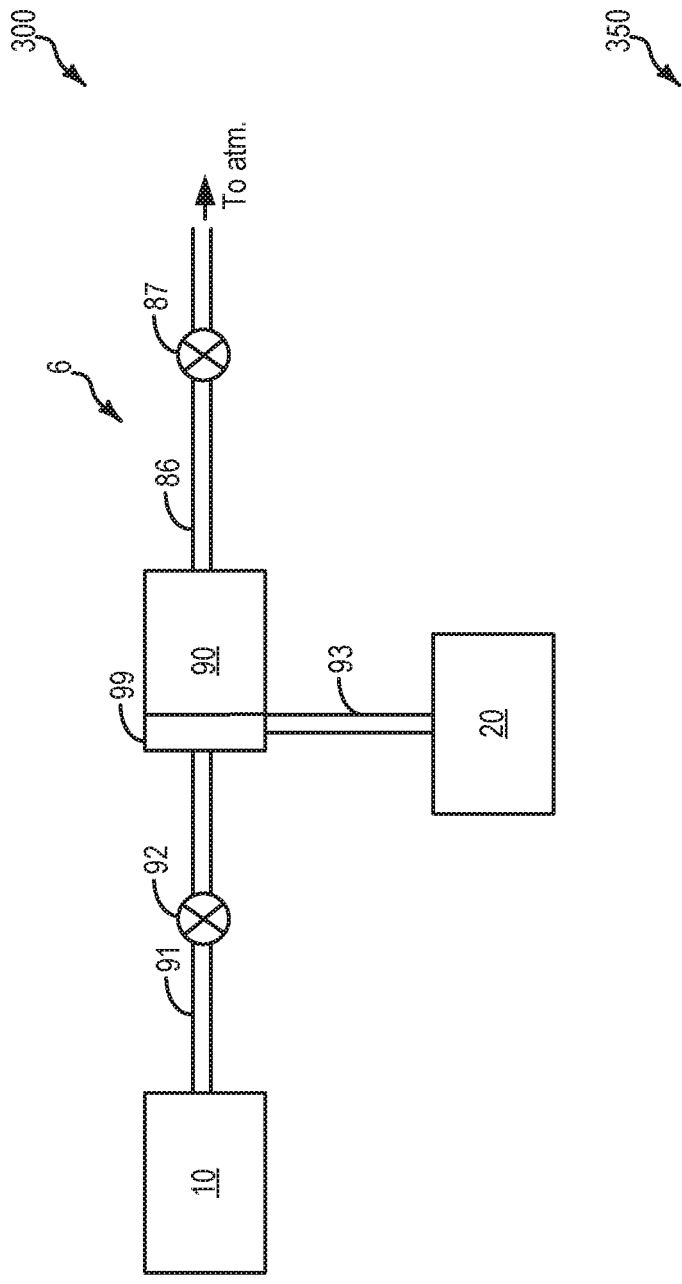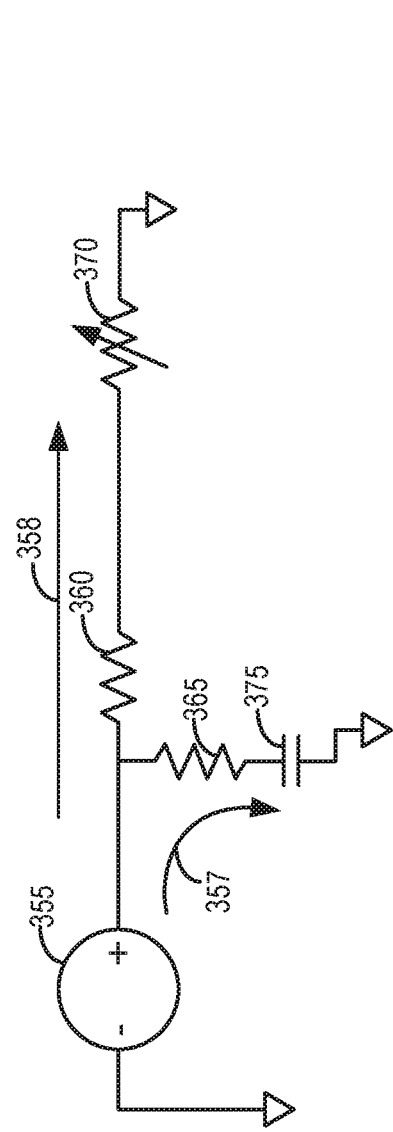
FIG. 3A
FIG. 3B

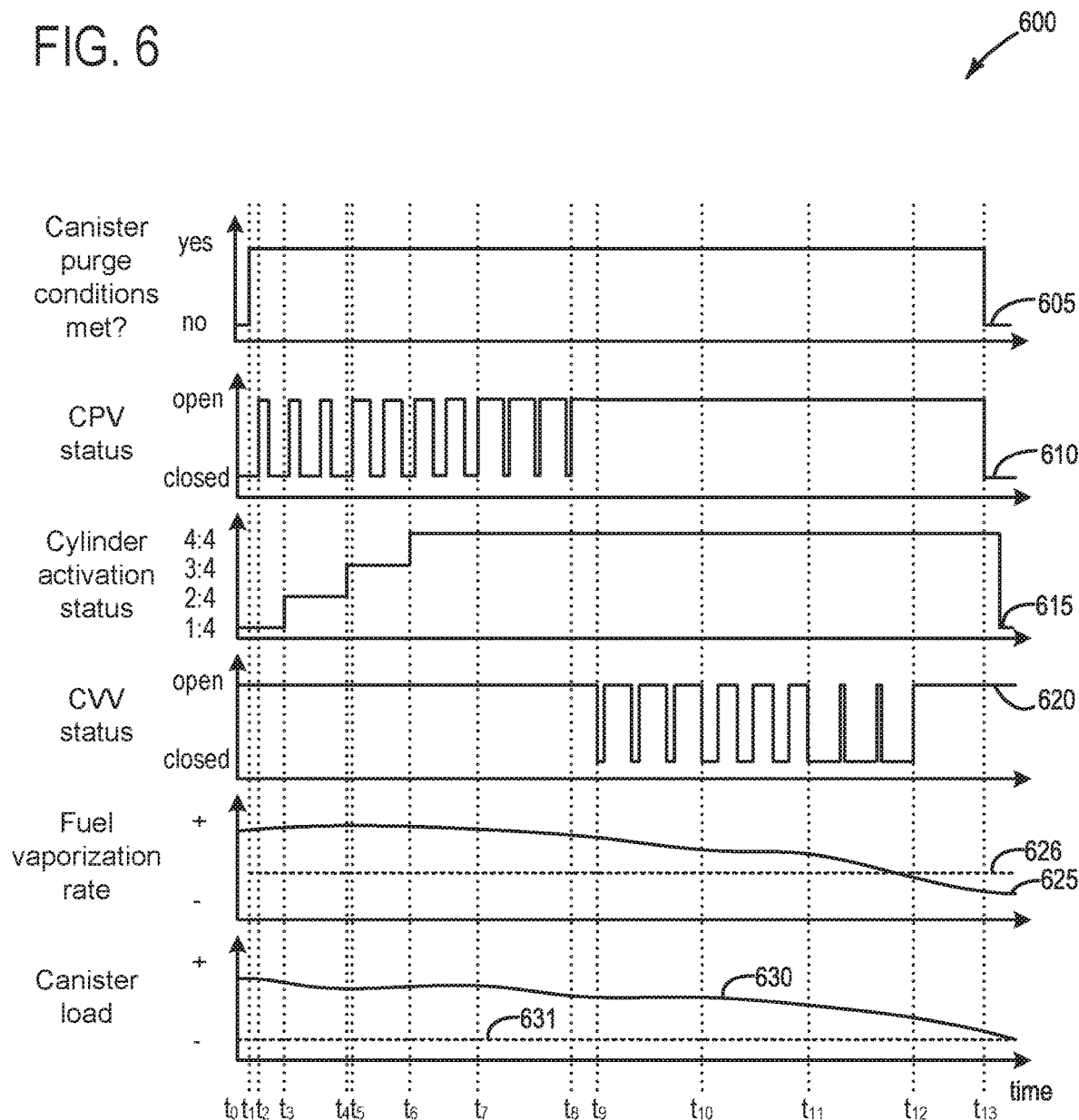

SYSTEMS AND METHODS FOR CONTROLLING FUEL VAPOR CANISTER PURGING OPERATIONS

FIELD

The present description relates generally to methods and systems for controlling a canister purging operation under conditions where fuel vaporization from a fuel tank coupled to the canister continues to load the canister while the purging operation is being conducted.

BACKGROUND/SUMMARY

Vehicle emission control systems may be configured to store fuel vapors from fuel tank refueling and diurnal engine operations in a fuel vapor canister containing a suitable adsorbent, and then purge the stored vapors during a subsequent engine operation. The stored vapors may be routed to an engine intake for combustion, which may thus improve fuel economy.

In a typical canister purge operation, a canister purge valve coupled between the engine intake and the fuel canister is opened, allowing for intake manifold vacuum to be applied to the fuel canister. In this way, desorption of stored fuel vapors from the adsorbent material in the canister may be facilitated, thereby regenerating the adsorbent material for further fuel vapor adsorption. However, reduced engine operation times in hybrid vehicles can lead to insufficient purging of fuel vapors from the vehicle's emission control system. For example, regions of adsorbent that see relatively less air flow may retain relatively more hydrocarbons. The residual hydrocarbons may desorb over a diurnal cycle, leading to an increase in bleed emissions. Such an issue may be relevant for start/stop (S/S) vehicles where the engine is shut down when engine torque demands are low, such as when the vehicle comes to a stop at a traffic light. Such issues may additionally be relevant to vehicles that actively reduce engine manifold vacuum in order to reduce pumping losses. One example may include vehicles with variable displacement engines (VDE), where one or more cylinders may be deactivated under certain vehicle operating conditions. Deactivation of the one or more cylinders of a VDE engine may involve sealing the one or more cylinders by commanding intake and exhaust valves closed, such that the piston(s) for the one or more cylinders act as air springs, and cutting off supply of fuel and spark to the one or more cylinders. While this may increase fuel economy and reduce pumping losses because the intake and exhaust valves are closed, such action may in some examples adversely impact fuel vapor storage canister purging efficacy.

In some examples, reduced engine operating times and reduced engine manifold vacuum levels as related to canister purging efficacy may be exacerbated during particular drive cycles where a rate of fuel vaporization may be greater than an ability of the engine to effectively purge the canister. For example, if a customer refuels a vehicle with a hot engine on a hot summer day, and the ensuing drive cycle results in one or more engine cylinders of a VDE engine being deactivated, the reduction in intake manifold vacuum resulting from less engine cylinders inhaling air may result in the canister becoming overloaded with fuel vapors instead of being efficiently purged to engine intake during a purging operation. This in turn may lead to an increase in release of undesired evaporative emissions to atmosphere, and may decrease fuel economy.

The inventors herein have recognized the above-mentioned issues, and have herein developed systems and methods to at least partially address them. In one example, a method comprises reactivating one or more cylinders of an engine while a fuel vapor storage canister positioned in an evaporative emissions control system of a vehicle is being purged of stored fuel vapors, in response to an indication that the purging of stored fuel vapors is compromised as a result of fuel vaporization stemming from a fuel tank positioned in a fuel system coupled to the evaporative emissions system. In this way, the issues related to fuel vaporization may be overcome by applying an increased negative pressure with respect to atmospheric pressure on the fuel system and evaporative emissions system.

As one example, reactivating the one or more cylinders may further comprise providing fuel and spark to the one or more cylinders, and reactivating one or more intake and exhaust valves coupled to the one or more cylinders. Fuel vaporization may be inferred as a function of one or more of a pressure in the fuel system, output of a hydrocarbon sensor positioned in a vent line coupling the fuel vapor storage canister to atmosphere and/or a temperature of the fuel vapor storage canister as monitored via one or more canister temperature sensor(s).

As another example, the engine may comprise a variable displacement engine, where reactivating the one or more cylinders is subsequent to the one or more cylinders being deactivated which may include cutting of fueling and spark to the one or more cylinders, and commanding one or more intake and exhaust valve(s) coupled to the one or more cylinders closed. Reactivating the one or more cylinders may be controlled to minimize a fuel economy penalty incurred by reactivating the one or more cylinders, for example.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A schematically depicts a simplified box-diagram of the engine, fuel system and evaporative emissions system of FIG. 1.

FIG. 3B schematically depicts the simplified box-diagram of FIG. 3A as a circuit diagram for illustrative purposes.

FIG. 6 depicts an example timeline for conducting a fuel vapor purging operation according to the methods of FIGS. 4-5.

DETAILED DESCRIPTION

Figure 1:
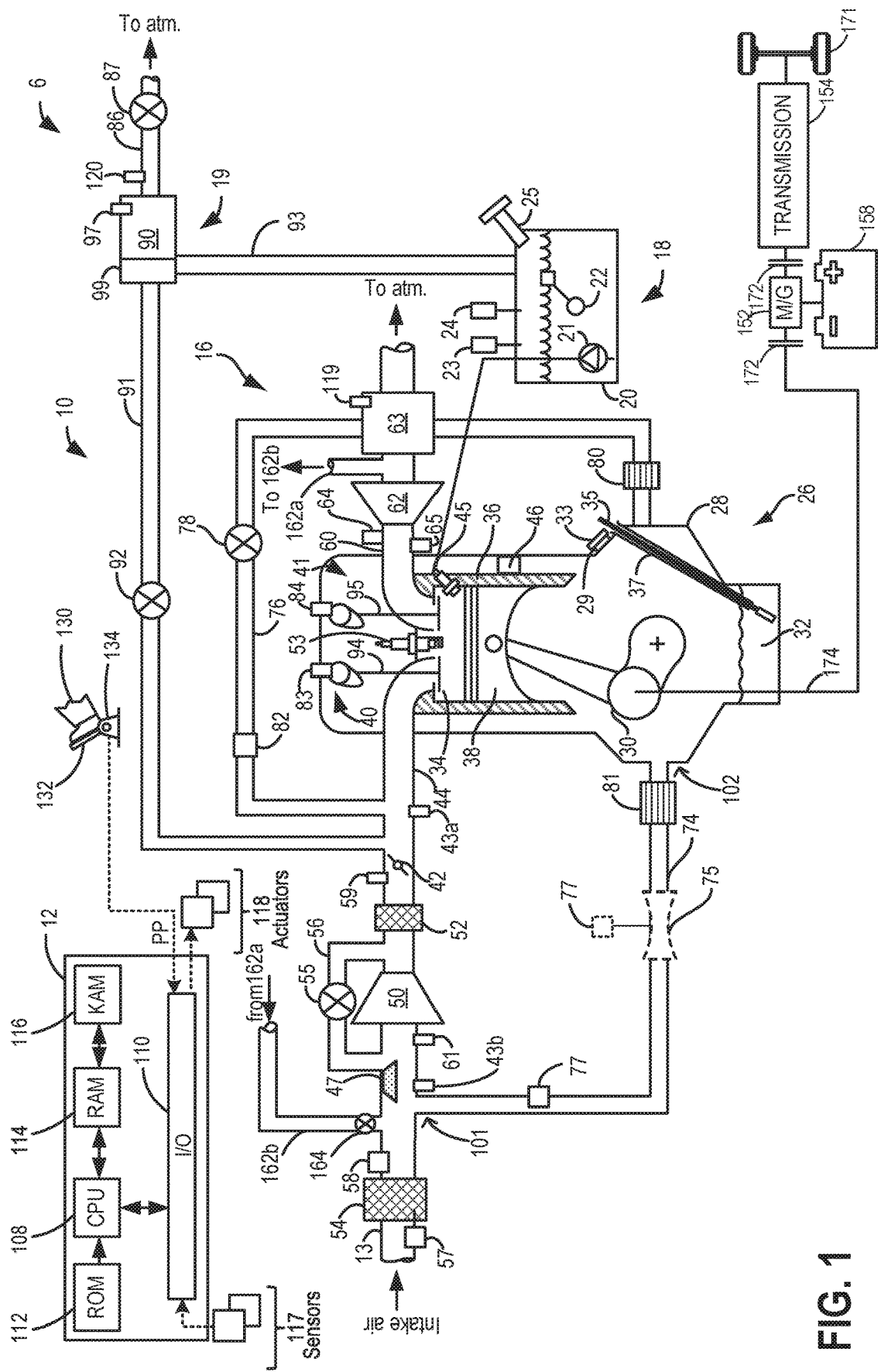
FIG. 1 shows a schematic description of an engine, fuel system and evaporative emissions system.
Figure 2:
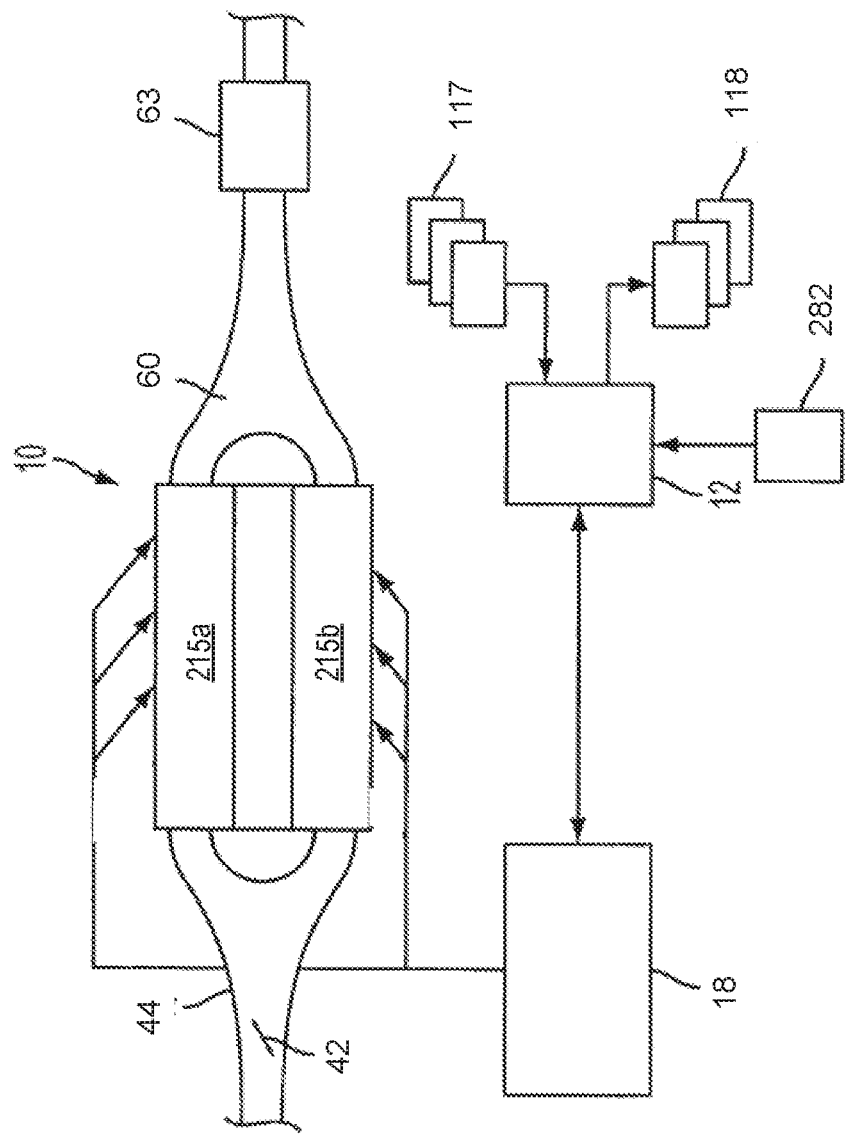
FIG. 2 schematically shows an example of a variable displacement engine (VDE).
Figure 4:
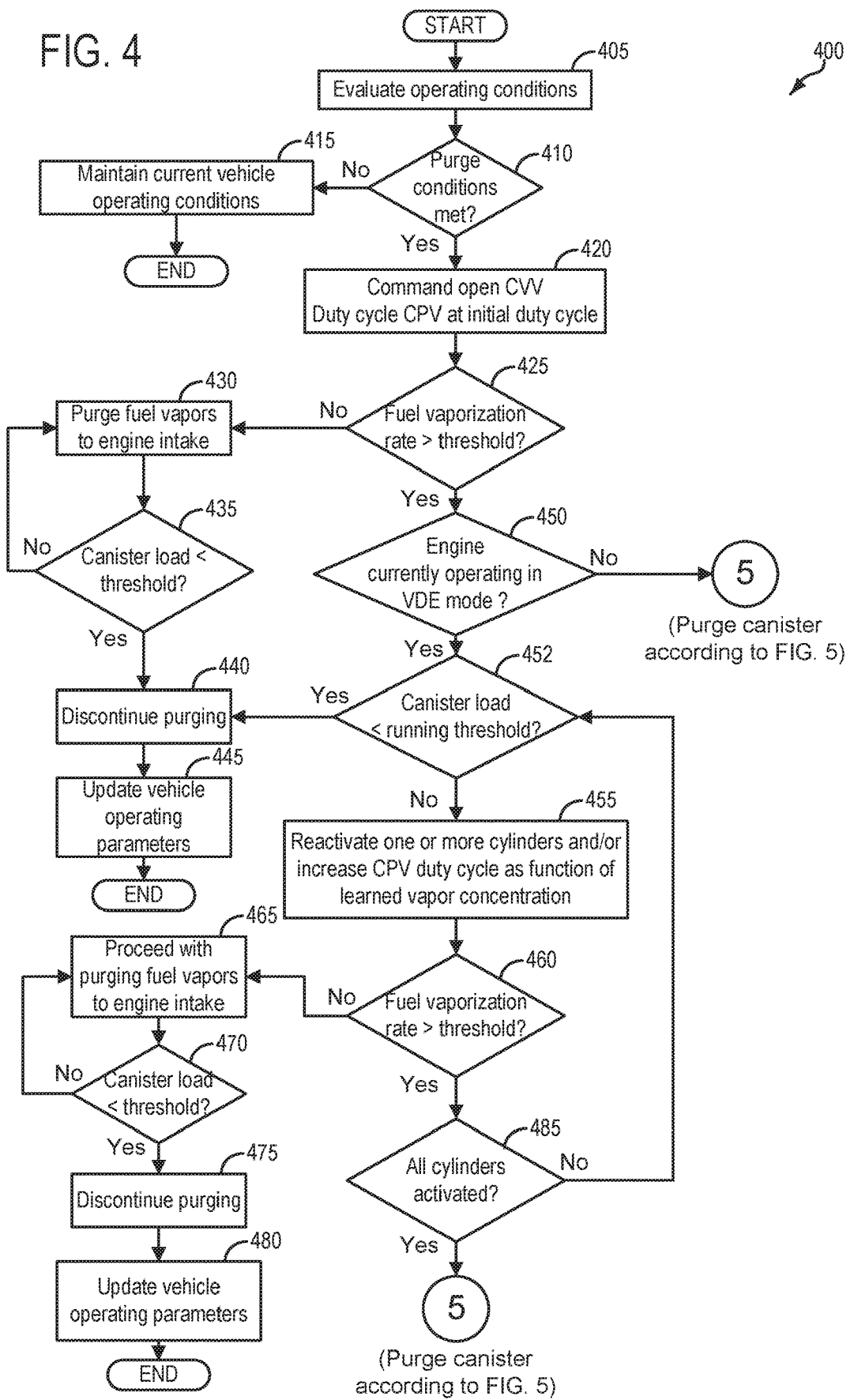
FIG. 4 depicts a high-level example method for increasing a negative pressure directed at the fuel system and evaporative emissions system during purging, under conditions where the engine is operating with one or more deactivated cylinders.
Figure 5:
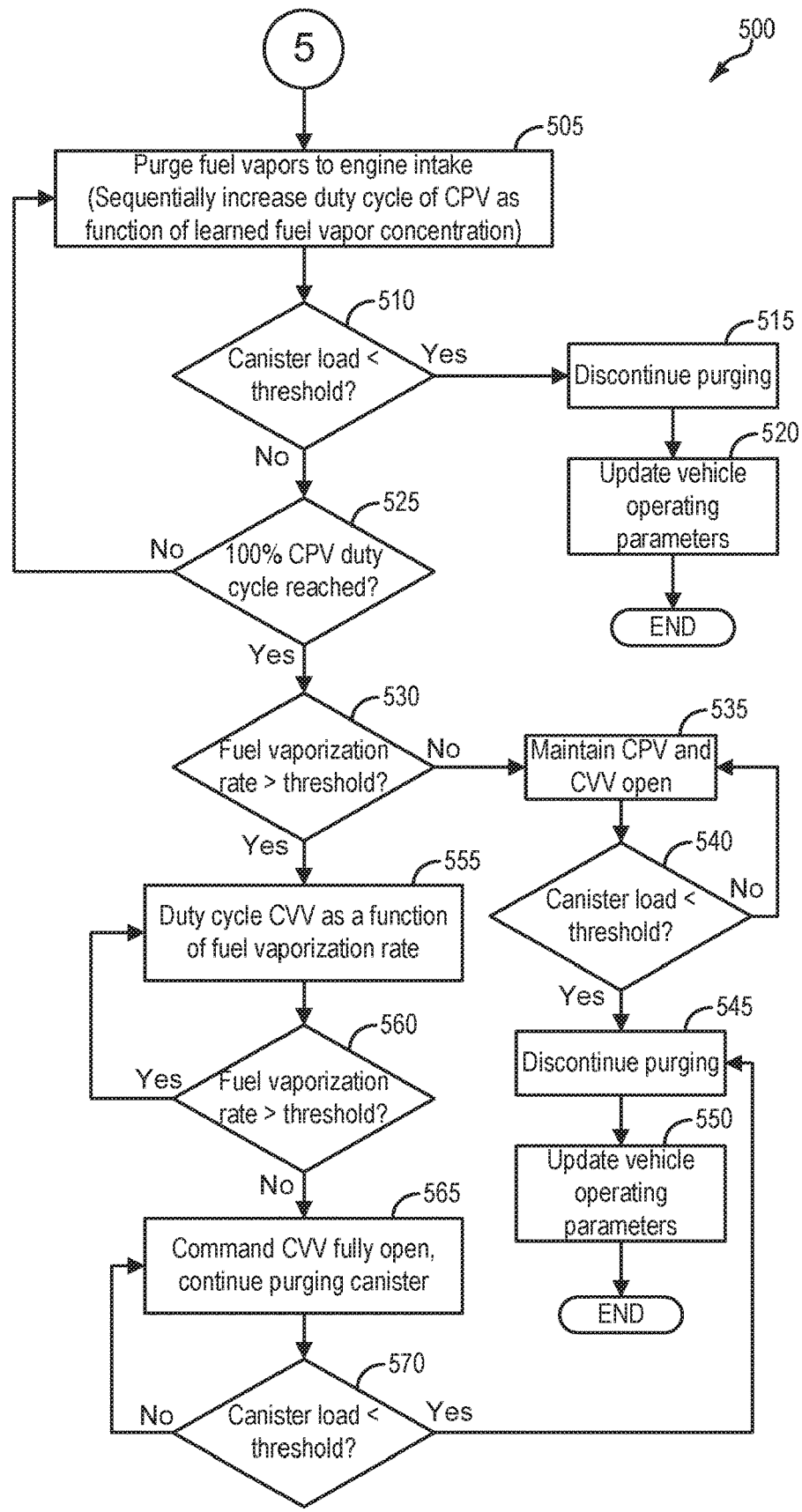
FIG. 5 depicts a high-level example method that continues from the method of FIG. 4, for actively altering a purge flow path resistance in order to more effectively purge fuel vapors to engine intake.

The following description relates to systems and methods for controlling purging of a fuel vapor storage canister positioned in an evaporative emissions system of a vehicle, under circumstances where a fuel vaporization rate is greater than a predetermined fuel vaporization threshold rate, and where an engine of the vehicle comprises a variable displacement engine and where one or more cylinders of the engine are deactivated during the purging of the canister. Such methodology may be particularly useful for hybrid electric vehicles where engine run time, and hence opportunities for purging the canister, are limited. Accordingly, FIG. 1 depicts an example illustration of a vehicle system that includes a variable displacement engine, a fuel vapor storage canister positioned in an evaporative emissions system, and a fuel system coupled to the evaporative emissions system. Another example illustration of the variable displacement engine of FIG. 1 is depicted at FIG. 2. FIG. 3A schematically depicts the vehicle system of FIG. 1 as a block diagram, and the block diagram of FIG. 3A is depicted as an electric circuit diagram at FIG. 3B. An example method for controlling the variable displacement engine during a purging operation where the fuel vaporization rate is greater than the predetermined fuel vaporization threshold rate is depicted at FIG. 4. Further methodology for controlling the purging operation under circumstances where all engine cylinders of the engine are activated to combust air and fuel is depicted at FIG. 5. An example timeline for controlling such a purging operation according to the methods of FIGS. 4-5, is depicted at FIG. 6.

Turning now to FIG. 1, a schematic depiction of a hybrid vehicle system 6 is presented that can derive propulsion power from engine system 10 and/or an on-board energy storage device, such as a battery system (see below). An energy conversion device, such as a generator (see below), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

A throttle 42 may be disposed in the engine intake to control the airflow entering intake manifold 44 and may be preceded upstream by compressor 50 followed by charge air cooler 52, for example. An air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. Intake air may bypass compressor 50 via compressor bypass conduit 56, during conditions wherein compressor bypass valve (CBV) 55 is opened. In this way, pressure buildup at the compressor inlet may be relieved.

Each cylinder of engine 10 may include one or more intake valves and one or more exhaust valves. For example, cylinder 34 is shown including at least one intake valve 94 and at least one exhaust valve 95 located at an upper region of cylinder 34. The valves of cylinder 34 may in some examples be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. As will be further discussed below at FIG. 2, engine 10 may comprise a variable displacement engine (VDE) where each cylinder of engine 10 may be selectively deactivatable, where deactivatable refers to the ability of the controller to command both intake and exhaust valves closed for particular cylinder(s), thus sealing the particular cylinders. If fuel injection is also stopped, then such action may result in the particular cylinder(s) being essentially an air-spring. Accordingly, as depicted herein, in one embodiment, deactivation of intake valve 94 may be controlled by first VDE actuator 83 while deactivation of exhaust valve 95 may be controlled by second VDE actuator 84. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

Cylinder 34 may have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, a first intake air oxygen sensor 43a (first IAO2 sensor) may be positioned downstream of throttle 42. Furthermore, in some examples, an air intake system hydrocarbon (AIS HC) trap 47 may be positioned downstream of air filter 54, but upstream of compressor 50. Still further, in some examples, a second intake air oxygen sensor 43b (second IAO2 sensor) may be positioned upstream of the throttle 42. Second intake air oxygen sensor 43b may constitute an intake air oxygen sensor utilize for exhaust gas recirculation (EGR) purposes, for example, and may be used in vehicles in which fuel is injected directly, for example gasoline turbo direct injection (GTDI) engines.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63. In some examples, an electric heater 119 may be coupled to the emission control device(s), and may be under control of the controller. Such an electric heater may be utilized in some examples to raise temperature of the emission control device to a light-off temperature, or otherwise referred to as operating temperature.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor, referred to herein as a crankcase pressure sensor (CKCP sensor) 77. When configured as a pressure sensor, CKCP sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. Additionally or alternatively, PCV line 76 may include a one-way valve (that is, a passive valve that tends to seal when flow is in the opposite direction) to prevent airflow from the intake manifold into the crankcase via PCV line 76 during boost conditions. In one embodiment, the PCV valve may actively or passively vary its flow restriction in response to the pressure drop across it (or flow rate through it). It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the PCV valve 78 may be a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel or un-combusted fuel, un-combusted fuel vapor, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 10 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor storage canister 90 (also referred to herein as fuel vapor canister, or just canister), via conduit 93, before being purged to engine intake manifold 44. While not explicitly illustrated, it may be understood that in some examples a fuel tank isolation valve (FTIV) may be positioned in conduit 93, enabling fuel tank 20 to be sealed from evaporative emissions system 19.

Fuel vapor canister 90 (also referred to herein as fuel vapor storage canister, or simply, canister) may be positioned in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve (CPV) 92. While a single canister 90 is shown, it will be appreciated that evaporative emissions system 19 may include any number of canisters (for example one or more bleed canisters positioned upstream of canister 90). In one example, CPV 92 may be a solenoid valve wherein opening or closing of the valve is performed via actuation of a canister purge valve solenoid. It may be understood that, in a case where the vehicle system 6 does not include an FTIV, purging the canister may also draw fuel vapors from the fuel tank to the engine for combustion. Furthermore, where vehicle system 6 does include an FTIV, the FTIV may be commanded open in response to purging conditions being met, to additionally purge fuel vapors from the fuel tank to engine intake. In still other circumstances (e.g. if the fuel tank is at a negative pressure with the FTIV closed, or if pressure in the fuel tank is within a threshold of atmospheric pressure), the FTIV may be maintained closed for a purging operation. Other control schemes for the FTIV with regard to purging operations may be understood to be within the scope of the present disclosure.

Canister 90 may include a buffer 99 (or buffer region), each of the canister and the buffer comprising the adsorbent. The volume of the buffer may be smaller than (e.g., a fraction of) the volume of canister 90. The adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent line 86 for routing gases out of the canister 90 to the atmosphere when storing, or trapping, fuel vapors from fuel tank 20. Vent line 86 may also allow fresh air to be drawn into fuel vapor canister 90 when purging stored fuel vapors to engine intake passage 13 via purge line 91 and CPV 92. While this example shows vent 86 communicating with fresh, unheated air, various modifications may also be used. Vent 86 may include a canister vent valve (CVV) 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter (not shown) may be coupled in vent 86 between canister vent valve 87 and atmosphere. In still other examples, a hydrocarbon sensor 120 may be positioned in vent line 86, and may be utilized to indicate a concentration or level of hydrocarbons escaping from canister 90. Said another way, hydrocarbon sensor 120 may detect a concentration or amount/level of bleed-through emissions from canister 90.

One or more pressure sensors 23 may be coupled to fuel system 18 for providing an estimate of a fuel system pressure. In one example, the fuel system pressure is a fuel tank pressure, wherein pressure sensor 23 is a fuel tank pressure transducer (FTPT) coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and canister 90. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling, diurnal, and running loss conditions), and/or the quantity of fuel vapor desorbed during a purging operation. The canister temperature may thus be used to infer the canister load, while changes in canister temperature may be used to determine the capacity and/or integrity of the fuel vapor canister.

Fuel vapors released from canister 90 as well as fuel tank 20, for example during a purging operation, may be directed into engine intake manifold 44 via purge line 91. The flow of vapors along purge line 91 may be regulated by CPV 92, coupled between the fuel vapor canister and the engine intake. The quantity and rate of vapors released by the CPV may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 91 to prevent intake manifold pressure from flowing gases in the opposite direction of the purge flow. As such, the check valve may be necessary if the canister purge valve control is not accurately timed or the canister purge valve itself can be forced open by a high intake manifold pressure.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open CVV 87 while closing CPV 92 to direct refueling vapors into canister 90 while preventing fuel vapors from being directed into the intake manifold.

As yet another example, the fuel system may be operated in a canister purging mode (e.g., after an emission control device light-off temperature has been attained and with the engine running), wherein the controller 12 may duty cycle canister purge valve 92 and command or maintain open CVV 87. Herein, the vacuum generated by the intake manifold of the operating engine may be used to draw fresh air through vent 86 and through fuel vapor canister 90 to purge the stored fuel vapors into intake manifold 44. It may be understood that in some examples such a purging event may further purge fuel vapors from fuel tank 20 to engine intake, as discussed above. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation, the learned vapor amount/concentration can be used to estimate a loading state of the fuel vapor canister.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, etc. Furthermore, controller 12 may monitor and adjust the position of various actuators 118 based on input received from the various sensors. These actuators may include, for example, throttle 42, intake and exhaust valve systems 40, 41, PCV valve 78, CPV 92, etc. Storage medium read-only memory 112 can be programmed with computer readable data representing instructions executable by processor 108 for performing the methods described below, as well as other variants that are anticipated but not specifically listed.

As discussed, hybrid vehicle system 6 may include multiple sources of torque available to one or more vehicle wheels 171, however, in other examples, the vehicle may include an engine without other sources of torque available. In the example shown, hybrid vehicle system 6 includes an electric machine 152. Electric machine 152 may be a motor or a motor/generator. Crankshaft 174 of engine 10 and electric machine 152 are connected via a transmission 154 to vehicle wheels 171 when one or more clutches 172 are engaged. In the depicted example, a first clutch is provided between crankshaft 174 and electric machine 152, and a second clutch is provided between electric machine 152 and transmission 154. Controller 12 may send a signal to an actuator of each clutch 172 to engage or disengage the clutch, so as to connect or disconnect crankshaft from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 (also described herein as onboard energy storage device) to provide torque to vehicle wheels 171. Electric machine 152 may also be operated as a generator to provide electrical power to charge traction battery 158, for example during a braking operation.

Hybrid vehicle system 6 may include an exhaust gas recirculation (EGR) system. Specifically, the EGR system may include one or more of high pressure EGR, or low pressure EGR. In the example illustration depicted at FIG. 1, a low pressure EGR system is illustrated. Specifically, an EGR passage is indicated, the EGR passage comprising passage 162a and 162b. It may be understood that passage 162a and 162b may comprise the same EGR passage, but is indicated as a broken passage for clarity. The EGR passage comprising passage 162a and 162b may further include EGR valve 164. By controlling timing of opening and closing of EGR valve 164, an amount of exhaust gas recirculation may be appropriately regulated.

Turning to FIG. 2, it shows one example where engine 10 comprises a variable displacement engine (VDE), including a first bank 215a and a second bank 215b. In the depicted example, engine 10 is a V6 engine with the first and second banks each having three cylinders. However, in alternate embodiments, the engine may have a different number of engine cylinders, such as 4, 8, 10, 12, etc. Engine 10 has intake manifold 44, with throttle 42, and exhaust manifold 60 coupled to an emission control device 63. Emission control device 63 includes one or more catalysts and air-fuel ratio sensors, such as described with regard to FIG. 1. As one non-limiting example, engine 10 can be included as part of a propulsion system for a passenger vehicle.

During selected conditions, such as when the full torque capability of the engine is not requested, one or more cylinders, such as one of a first or second cylinder group, may be selected for deactivation (herein deactivation of one or more engine cylinders is also referred to as a VDE mode of operation). Specifically, one or more cylinders may be deactivated by shutting off respective fuel injectors while commanding intake and exhaust valves closed. While fuel injectors of the disabled cylinders are turned off, the remaining enabled cylinders continue to carry out combustion with fuel injectors active and operating. To meet torque requirements, the engine may produce the same amount of torque on those cylinders for which the injectors remain enabled. This may require higher manifold pressures, resulting in lowered pumping losses and increased engine efficiency. Also, the lower effective surface area (from only the enabled cylinders) exposed to combustion reduces engine heat losses, improving the thermal efficiency of the engine. In alternate examples, engine system 10 may have cylinders with selectively deactivatable intake and/or exhaust valves wherein deactivating the cylinder includes deactivating the intake and/or exhaust valves.

Cylinders may be grouped for deactivation in a bank-specific manner. For example, in FIG. 2, the first group of cylinders may include the three cylinders of the first bank 215a while the second group of cylinders may include the three cylinders of the second bank 215b. In an alternate example, instead of one or more cylinders from each bank being deactivated together, two cylinders from each bank of the V6 engine may be selectively deactivated together. In still another example, only one cylinder may be deactivated. In still other examples, any number of cylinders may be deactivated.

Engine 10 may operate on a plurality of substances, which may be delivered via fuel system 18. Engine 10 may be controlled at least partially by a control system including controller 12. As discussed above, controller 12 may receive various signals from sensors 117 coupled to engine 10, and send control signals to various actuators 118 coupled to the engine and/or vehicle.

Fuel system 18 may be further coupled to a fuel vapor recovery system (not shown here but see FIG. 1) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

Controller 12 may receive an indication of cylinder knock or pre-ignition from one or more knock sensors 282 distributed along the engine block. When included, the plurality of knock sensors may be distributed symmetrically or asymmetrically along the engine block. As such, the one or more knock sensors 282 may be accelerometers, or ionization sensors.

Thus, the systems described above with regard to FIGS. 1-2 may enable a system for a vehicle comprising a fuel vapor storage canister positioned in an evaporative emissions system of the vehicle, the evaporative emissions system fluidically coupled to atmosphere via a canister vent valve, fluidically coupled to an engine via a canister purge valve, and fluidically coupled to a fuel tank positioned in a fuel system of the vehicle. Such a system may further comprise a controller with computer readable instructions stored on non-transitory memory. When executed, such instructions may cause the controller to conduct a purging operation of the fuel vapor storage canister by duty cycling the canister purge valve with the canister vent valve fully open. In response to an indication that a rate of fuel vaporization stemming from the fuel tank is greater than a predetermined fuel vaporization threshold rate during the purging operation of the fuel vapor storage canister, the controller may reactivate one or more cylinders of the engine to combust air and fuel, thereby reducing the rate of the fuel vaporization and increasing an efficiency of the purging operation.

In such a system, the engine may comprise a variable displacement engine. The controller may store further instructions to reactivate the one or more engine cylinders by resuming providing fuel and spark to the one or more cylinders, and resuming operation of one or more intake and exhaust valve(s) coupled to the one or more engine cylinders.

In such a system, the controller may store further instructions to sequentially increase a duty cycle of the canister purge valve during the purging operation.

In such a system, the controller may store further instructions to, in response to all engine cylinders combusting air and fuel, and further responsive to the rate of fuel vaporization remaining greater than the predetermined fuel vaporization threshold rate, control a duty cycle of the canister vent valve in order to direct a negative pressure stemming from the engine preferentially at the fuel tank instead of an entirety of the fuel vapor canister, to reduce the rate of fuel vaporization to below the predetermined fuel vaporization threshold rate.

In such a system, the system may further comprise one or more of a fuel tank pressure transducer, a hydrocarbon sensor positioned in a vent line that couples the evaporative emissions system to atmosphere, and/or one or more temperature sensor(s) positioned in the fuel vapor storage canister near the vent line. The controller may store further instructions to infer the fuel vaporization rate based on one or more of a fuel tank pressure transducer output, a hydrocarbon sensor output, and/or a temperature sensor output.

Turning now to FIG. 3A, a simplified box diagram 300 depicting a select number of components of hybrid vehicle 6, is shown. Fuel tank 20 is depicted as being fluidically coupled via conduit 93 to fuel vapor canister 90, which includes buffer 99. Canister 90 is selectively fluidically coupled to atmosphere via CVV 87, positioned in vent line 86, and is selectively fluidically coupled to engine 10 via CPV 92, positioned in purge line 91. While not explicitly illustrated, it may be understood that in some examples, there may be a filter positioned where buffer 99 contacts purge line 91, to filter particulate during a purging operation prior to being routed to engine intake.

FIG. 3A is depicted as a simplified box diagram in order to convey the simplified componentry as an electrical circuit diagram at FIG. 3B. Considering the relevant componentry of FIG. 3A as an electrical circuit diagram is relevant to the present disclosure for understanding purge flow, particularly the active manipulation of purge flow depending on fuel tank fuel vaporization rates during purging operations, discussed in further detail below in particular with regard to FIGS. 4-5.

Accordingly, turning to FIG. 3B, circuit diagram 350 is shown. Power source 355 may be considered as engine 10. When power source 355 is turned on (e.g. voltage supplied to circuit 350), or in other words when a purge is initiated (e.g. power supply correlates to engine manifold vacuum for a purge operation), current flow (corresponding to negative pressure flow in the physical vehicle system that stems from engine operation) through circuit diagram 350 may be understood to mainly be via a first loop, depicted as 357. More specifically, because the canister 90, represented as second resistor 360, is much more restrictive than buffer 99 (and in some examples a filter), represented as first resistor 365, current flow is initially mainly via the first loop 357. It may be understood that capacitor 375 represents a fuel vapor space of fuel tank 20. When capacitor 375 charges up, a potential voltage is generated at the capacitor which counters the voltage supplied by power source 355. At such a point when the capacitor is charged (corresponding to a threshold negative pressure build in the fuel tank in the physical vehicle system), it may be understood that current may then flow mainly through a second loop, depicted as 358. In other words, once a threshold vacuum develops in the fuel tank (corresponding to charging of the capacitor) in response to a purge event, the threshold vacuum in some examples a function of fuel level, fuel vaporization rate, etc., then the first loop 357 becomes more restrictive than second loop 358. Said another way, a capacitor time constant for capacitor 375 may be understood to be proportional to fuel tank vapor space. Current flow (corresponding to negative pressure flow) through second loop 358 may be understood to be via second resistor 360 (corresponding to canister 90). Furthermore, CVV 87 is depicted as a variable potentiometer 370. In other words, duty cycling the CVV may be understood to be similar to increasing a resistance of potentiometer 370. If the resistance of potentiometer 370 becomes great enough (corresponding to a duty cycle of the CVV), then it may be understood that the path of least resistance may once again become via the first loop 357. Such CVV control is discussed in further detail below in particular with regard to FIG. 5.

The electrical circuit analogy of FIG. 3B in relation to the physical vehicle system of FIG. 3A is relevant to the present disclosure because it may be understood that under certain circumstances where a fuel vaporization rate of fuel in the fuel tank is greater than an ability of the engine to purge out the canister during a purging operation, the CVV may be duty cycled, which may be understood to cause the purge path via the second loop 358 to become more restrictive than the path via the first loop 357. In other words, considering the electrical circuit analogy, fuel vaporization may correspond to a decharging of the capacitor. By actively directing the purge path to be via the first loop 357, intake manifold vacuum may be directed preferentially at the fuel tank thereby purging vapors directly from the fuel tank. Once the vaporization of fuel in the tank has been managed as such, for example once the vacuum is established in the fuel tank, then control strategy may control the second loop (e.g. 358) to be less restrictive than the first loop (e.g. 357), for example via commanding open the CVV, such that canister purging is resumed. Said another way, it may be understood that it may be futile to attempt to clean the fuel vapor canister under conditions where a loading rate of the canister due to fuel vaporization effects is greater than the rate at which the canister is being purged. Thus, it may be desirable to decrease fuel vaporization to a level where the canister is no longer being loaded at a rate greater than that which it may be purged of stored fuel vapors, and at such a point the canister purging may resume more efficiently. Such a strategy for actively directing manifold vacuum towards the fuel tank when high fuel vaporization rates are detected will be discussed in further detail below with regard to the methods of FIGS. 4-5, and the example timeline of FIG. 6. Discussed herein, it may be understood that fuel vaporization rates greater than a predetermined fuel vaporization threshold rate may comprise fuel vaporization rates whereby loading of the canister with fuel vapors occurs at a rate faster than the purging of vapors from the canister.

In some examples, as mentioned briefly above, an inability to effectively purge the fuel vapor canister under situations where fuel vaporization is contributing to a loading of the canister at a rate greater than a rate at which the canister is purged of fuel vapors may be due to an insufficient amount of vacuum directed at the fuel vapor canister and/or fuel tank for effective purging of the canister. Specifically, as an example, in a case where the engine is operating in the VDE mode of operation with one or more engine cylinders deactivated, a reduced intake manifold vacuum may be contributing to the inability to effectively purge the canister, or in other words, compromising purging efficacy. Thus, in such a circumstance, it may be beneficial to reactivate one or more of the deactivated engine cylinders to increase intake manifold vacuum, which may thus increase purging efficiency. In such an example, if after reactivating all engine cylinders it is still determined that fuel vaporization is contributing to loading the canister at a rate greater than the rate of purging stored vapors from the canister, then additional action may be taken, which may include duty cycling the CVV to direct intake manifold vacuum at the fuel tank, as discussed above.

Accordingly, turning now to FIG. 4, a high-level example method 400 is shown, depicting how a fuel vaporization rate may be monitored during a canister purging operation, and if it is indicated that fuel vaporization rate is greater than a predetermined fuel vaporization threshold rate, then a first mode of action may be to reactivate one or more engine cylinders, provided the engine is being operated in the VDE mode of operation. If, upon reactivation of all engine cylinders (or under circumstances where the engine is not being operated in the VDE mode), it is indicated that the fuel vaporization rate continues to be greater than the predetermined fuel vaporization threshold rate, then method 400 may proceed to method 500 depicted at FIG. 5, where the CVV may be controlled as discussed above to direct the intake manifold vacuum preferentially at the fuel tank rather than the canister, with the objective of reducing the fuel vaporization rate to below the predetermined fuel vaporization threshold rate. In this way, purging efficiency may be improved under circumstances where purging efficiency would otherwise be compromised, and which may lead to incomplete canister purging and/or release of undesired evaporative emissions to atmosphere. Thus, by improving purging efficiency under such conditions, release of undesired evaporative emissions to atmosphere may be reduced or avoided, and fuel economy may be improved.

Method 400 will be described with reference to the systems described herein and shown in FIGS. 1-2, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-2. The controller may employ actuators such as CPV (e.g. 92), CVV (e.g. 87), first VDE actuator (e.g. 83), second VDE actuator (e.g. 84), fuel injector(s) (e.g. 45), spark plug(s) (e.g. 53), etc., to alter states of devices in the physical world according to the methods depicted below.

Method 400 begins at 405, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 410, method 400 includes indicating whether conditions are met for purging the fuel vapor canister. Conditions being met for doing so may include one or more of an intake manifold vacuum of at least a predetermined threshold intake manifold vacuum, a canister loading state greater than a predetermined canister loading state threshold, and indication of an absence of other diagnostics in progress which may be adversely impacted by conducting the purging operation, and engine-on condition where the engine is combusting air and fuel, an exhaust catalyst temperature above a light-off temperature, a predetermined time duration elapsing since a prior purging operation, an indication that fuel vapor are escaping from the canister, etc. If, at 410, conditions are not indicated to be met for conducting the purging operation, method 400 may proceed to 415. At 415, method 400 may include maintaining current vehicle operating conditions. Maintaining current vehicle operating conditions at 415 may include maintaining current engine operating parameters according to driver demand while maintaining the CPV closed so as not to initiate purging of the canister. Method 400 may then end.

Returning to 410, responsive to conditions being met for purging the canister, method 400 may proceed to 420. At 420, method 400 may include commanding open or maintaining open the CVV, and may further include commanding the CPV to be duty cycled at a predetermined initial duty cycle. In a case where the vehicle includes an FTIV (discussed above with regard to FIG. 1), the FTIV may be commanded open for additionally purging the fuel tank. However, in some examples where pressure in the tank is below a predetermined threshold pressure, then the FTIV may be maintained closed during purging. Proceeding to 425, method 400 includes indicating whether the fuel vaporization rate of fuel in the fuel tank is greater than the predetermined fuel vaporization threshold rate. As discussed above, the predetermined fuel vaporization threshold rate may comprise a rate of fuel vaporization that is contributing to loading of the canister faster than a rate at which fuel vapors are being purged from the canister. Such a determination may be made based on one or more of the following indications. In one example, a fuel vaporization rate that is loading the canister at a rate faster than the rate at which vapors are being purged from the canister may be inferred by the FTPT. For example, if the FTPT (e.g. 23) registers a positive pressure with respect to atmospheric pressure, then the inference may be that pressure is building in the fuel tank rather than the desired vacuum being developed, and thus it may be determined that the canister is being loaded with fuel vapors stemming from the fuel tank faster than the applied vacuum can purge vapors from the canister and fuel tank. Additionally or alternatively, in another example the hydrocarbon sensor (e.g. 120) may be relied upon for inferring fuel vaporization that is overwhelming the canister and leading to inefficient purging. For example, an output from the hydrocarbon sensor indicative of a fuel vapor concentration greater than a predetermined fuel vapor concentration in the vent line (e.g. 86), may be indicative of a fuel vaporization rate that is loading the canister faster than the canister is being purged of stored fuel vapors. Additionally or alternatively, one or more temperature sensor(s) positioned in the canister near the vent line may be relied upon to infer whether the canister is continuing to be loaded with fuel vapors, as opposed to being purged of fuel vapors. For example, if the one or more temperature sensor(s) indicate a temperature increase, even while the purging operation is ongoing, the inference may be that the fuel vapor canister is being further loaded with fuel vapors. More specifically, fuel vapor adsorption by the canister comprises an exothermic event, and thus a temperature increase as monitored by the one or more temperature sensor(s) may be an indication that the canister is being further loaded rather than being efficiently purged, and thus that the fuel vaporization rate is greater than the predetermined fuel vaporization threshold rate. In some examples, such inferences as to fuel vaporization rate made by the FTPT, HC sensor, and/or canister temperature sensor(s) may additionally rely on other variables such as temperature recorded by the fuel tank temperature sensor (e.g. 24), engine temperature, ambient temperature, fuel level, etc.

If, at 425, it is indicated that the current fuel vaporization rate is not greater than the predetermined fuel vaporization rate, method 400 may proceed to 430. At 430, method 400 may include continuing the purging of fuel vapors from the canister to engine intake. In other words, if the vehicle is operating in VDE mode, the current VDE mode of operation may be maintained, without reactivating engine cylinders to increase purging efficiency. Furthermore, at 430, while not explicitly illustrated, it may be understood that a duty cycle of the CPV may be sequentially increased as a function of a learned fuel vapor concentration stemming from the purging of the canister. For example, the exhaust gas sensor (e.g. 64) may be relied upon for determining an exhaust air-fuel ratio, which may be used in conjunction with levels of fuel injection and air flow to the engine to ascertain an amount of vapors being inducted to the engine due to the purging operation. In this way, the fuel vapor concentration stemming from the canister may be learned during the purging operation, and the CPV duty cycle may be correspondingly sequentially increased in order to effectively purge the canister while also avoiding issues related to engine hesitation and/or stall. Furthermore, the learned vapor concentration may be relied upon via the controller of the vehicle for indicating a current canister loading state.

Accordingly, proceeding to 435, method 400 may include indicating whether the canister loading state is less than a predetermined threshold loading state. For example, the predetermined threshold loading state may comprise a canister that is 5% loaded or less. In other words, the predetermined threshold loading state may comprise a loading state of the canister where the canister is understood to be substantially cleaned of fuel vapors. If, at 435, the canister is not indicated to be clean as a result of the purging operation, method 400 may return to 430, where purging of the canister may continue. For example, the duty cycle of the CPV may be progressively increased as a function of the learned fuel vapor concentration being inducted to the engine, until it is indicated that the canister is clean.

Responsive to the canister being indicated to be clean (or if vehicle operating conditions change such that conditions for purging are no longer met), method 400 may proceed to 440. At 440, method 400 may include discontinuing purging of the canister. Specifically, the CPV may be commanded closed, thus sealing the canister from engine intake. In this way, canister purging may be terminated. Subsequently, method 400 may proceed to 445, where vehicle operating parameters may be updated. For example, a canister loading state may be updated to reflect the purging event, a canister purging schedule may be updated as a function of the purging event, etc. Method 400 may then end.

Returning to 425, in response to an indication that the fuel vaporization rate is greater than the predetermined fuel vaporization threshold rate, method 400 may proceed to 450. At 450, method 400 may include indicating whether the engine is currently operating in a VDE mode of operation where one or more engine cylinders are deactivated. If not, then method 400 may proceed to FIG. 5, where the canister may be purged according to method 500. Alternatively, if the engine is currently operating in the VDE mode, then method 400 may proceed to 452.

At 452, method 400 may include indicating whether the canister loading state is less than a running threshold. It may be understood that the running threshold at 452 may comprise a loading state greater than the predetermined threshold loading state, but below another loading state (e.g. 50%, 60%, etc.). In other words, the running threshold may comprise a canister loading state where, in terms of fuel economy considerations and evaporative emissions considerations, it may be desirable to discontinue the purging and then continue purging at another time when the canister is more loaded and/or under conditions where the engine is not operating in VDE mode. If, at 452, canister loading state is indicated to be below the running threshold, method 400 may proceed to 440 where purging is discontinued as discussed above. Proceeding to 445, method 400 may include updating vehicle operating parameters. Updating vehicle operating parameters may include scheduling a purge event at the next opportunity where the vehicle is not operating in VDE mode, for example. In this way, engine cylinder reactivation may be postponed and instead, purging may be discontinued, which may in some examples improve fuel economy while also avoiding undesirable release of evaporative emissions to the environment.

If, at 452, canister loading state is not below the running threshold, method 400 may proceed to 455. At 455, method 400 may include reactivating one or more of the deactivated engine cylinders and/or increasing a duty cycle of the CPV, in order to increase efficiency of the purging of fuel vapors from the fuel vapor canister. It may be understood that reactivating one or more deactivated engine cylinders may involve controlling intake and exhaust valve(s) to once again open and close (e.g. via VDE actuators 83, 84 respectively) as a function of engine cycle, and providing fuel injection and spark to the deactivated cylinder(s). At 455 engine control strategy may make a determination as to how to most effectively increase efficiency of the purging of fuel vapors from the canister, taking into account one or more variables such as fuel economy, avoidance of potential engine hesitation and/or stall scenarios, etc. The strategy may be a function of the fuel vaporization rate itself, for example the greater the fuel vaporization rate, the more aggressive the mitigating action for increasing purging efficiency, in some examples at an expense of fuel economy. Thus, in some examples where an entire bank of engine cylinders is deactivated for operating the engine in VDE mode, the entire bank may be reactivated in order to increase the vacuum directed at the fuel tank and fuel vapor canister in order to overwhelm the fuel vaporization contributing to canister loading, and instead effectively purge fuel vapors from the canister and fuel tank to engine intake. In other examples where a plurality of engine cylinders are deactivated for operating the engine in the VDE mode, engine cylinders may be reactivated one at a time, where after each reactivation, fuel vaporization is monitored and assessed as to whether the increased vacuum imparted on the fuel system and evaporative emissions system has served to resolve the issue of the canister being overloaded with fuel vapors during the purging. In each of the above examples, duty cycle of the CPV may additionally be sequentially ramped up as discussed above, to increase the amount of negative pressure applied on the fuel system and evaporative emissions system.

It may be understood that in response to the reactivation of one or more engine cylinders and/or ramping up of the CPV duty cycle in order to increase the purging efficiency, fuel injection amount and/or timing, and/or spark timing to one or more engine cylinders may be controlled so as to avoid potential engine stall events which may occur in response to the increased vacuum resulting in rich vapor mixtures being inducted to the engine. The adjustments to fuel injection amount and/or timing, and/or spark timing, may be a function of the learned fuel vapor concentration being inducted to the engine, and may further be a function of an increase in vacuum expected to be communicated to the fuel system and evaporative emissions system as a result of the one or more engine cylinders being reactivated and/or ramping up of the CPV duty cycle.

Accordingly, in response to reactivation of one or more engine cylinders and/or increase in CPV duty cycle, method 400 may proceed to 460, where it may be inferred as to whether the engine cylinder(s) reactivation and/or increase in CPV duty cycle has resulted in the fuel vaporization rate decreasing to below the predetermined fuel vaporization threshold rate, such that canister purging efficiency is increased. Such an inference may be made as discussed above with regard to step 425 of method 400, for example. If, at 460, the fuel vaporization rate has been reduced to below the predetermined fuel vaporization threshold rate, or said another way, if at 460 it is indicated that the rate at which vapors are being purged from the canister is greater than the rate at which the canister is being loaded with vapors, method 400 may proceed to 465. In some examples, a negative pressure with respect to atmosphere as monitored by the FTPT (e.g. 23) may be indicative that the rate at which vapors are being purged from the canister is greater than the rate at which the canister is being loaded with fuel vapors. At 465, method 400 may include proceeding with purging fuel vapors, similar to that discussed above with regard to 430. For example, CPV duty cycle may continue to be ramped up as a function of learned fuel vapor concentration stemming from the canister, while any cylinders that are still deactivated may be maintained deactivated, since the issues related to fuel vaporization have been mitigated. Furthermore, in some examples, one or more engine cylinders may be re-deactivated while the purging continues, due to the fuel vaporization issue being under control. In such an example, fuel vaporization may be continued to be monitored throughout the rest of the purging event, and if fuel vaporization once again becomes greater than the predetermined fuel vaporization threshold rate, then mitigating action in the form of reactivating one or more engine cylinders may be once again commanded.

Proceeding to 470, method 400 may include indicating whether canister load is less than the predetermined threshold loading state, as referenced above at step 435. If not, method 400 may return to 465 where the purging operation may continue. In response to the canister load being indicated to have decreased to the predetermined threshold loading state (or in response to conditions no longer being met for continuing the purging operation), method 400 may proceed to 475, where purging may be discontinued via the commanding closed of the CPV. Proceeding to 480, method 400 may include updating vehicle operating parameters. For example, canister loading state may be updated based on the purging event, and a canister purge schedule may be updated to reflect the purging operation. In some examples, depending on driver demand, one or more engine cylinders may once again be deactivated. For example, if driver-demanded engine torque is such that VDE mode may be entered, then such action may be commanded via the controller. Method 400 may then end.

Returning to 460, in response to an indication that the fuel vaporization rate remains above the predetermined fuel vaporization threshold rate, method 400 may proceed to 485. At 485, method 400 may include indicating whether all engine cylinders are activated. If not, method 400 may return to 452, where it may be indicated as to whether the canister loading state is below the running threshold. If so, method 400 may proceed to 440 as discussed above. Alternatively, if canister load is not below the running threshold at 452, method 400 may again proceed to 455 where one or more engine cylinders may be reactivated and/or CPV duty cycle may be increased, in a further attempt to reduce the fuel vaporization rate to below the predetermined fuel vaporization threshold rate. Such methodology may be continued until the fuel vaporization rate is less than the predetermined fuel vaporization threshold rate, or until all cylinders are activated (or in some examples when canister load is below the running threshold). Thus, if at 485, it is indicated that all cylinders are activated, method 400 may proceed to method 500 depicted at FIG. 5, where further mitigating action may be undertaken.

Turning now to FIG. 5, it may be understood that method 500 continues from method 400, and as such may be carried out by a controller such as controller 12 depicted at FIG. 1, and may be stored at the controller as executable instructions in non-transitory memory. Instructions for carrying out method 500 may be stored on a memory of the controller and in conjunction with signals received from sensors of the engine system, such as the sensors described above with reference to FIGS. 1-2. The controller may employ actuators such as CPV (e.g. 92), CVV (e.g. 87), first VDE actuator (e.g. 83), second VDE actuator (e.g. 84), fuel injector(s) (e.g. 45), spark plug(s) (e.g. 53), etc., to alter states of devices in the physical world according to the methods depicted below.

At 505, method 500 includes continuing to ramp up the duty cycle of the CPV as a function of learned fuel vapor concentration, as a means for imparting increased vacuum on the fuel system and evaporative emissions system, as discussed above. At 510, method 500 includes indicating whether canister load is below the predetermined threshold loading state, discussed above. In other words, if the ramping up of the duty cycle of the CPV with all cylinders combusting air and fuel has resulted in the intake manifold vacuum overcoming the fuel vaporization rate such that purging of the canister has become more efficient to the point where the canister is purged to below the predetermined threshold loading state, then method 500 may proceed to 515. At 515, method 500 may include discontinuing the purging event, which may include commanding closed the CPV. Proceeding to 520, method 500 may include updating vehicle operating parameters to reflect the purging event. Updating vehicle operating parameters may include updating the current canister loading state, and may further include updating a canister purging schedule to reflect the recent purging event. At 520, provided conditions are met for doing so, one or more engine cylinders may be again deactivated as a function of driver demand. Method 500 may then end.

Returning to 510, in response to canister loading state remaining above the predetermined threshold loading state, method 500 may proceed to 525. At 525, method 500 may include indicating whether the CPV duty cycle has reached a 100% duty cycle, or in other words, if the CPV is commanded fully open without being periodically closed, for purging the canister. If not, method 500 may return to 505, where the CPV duty cycle may continue to be ramped up as a function of learned fuel vapor concentration stemming from the canister, in order to increase the vacuum applied on the canister for increasing purging efficiency.

Alternatively, in response to an indication that the duty cycle of the CPV is at 100%, method 500 may proceed to 530. At 530, method 500 may include indicating whether the fuel vaporization rate is still greater than the predetermined fuel vaporization threshold rate. If not, method 500 may proceed to 535. In other words, in response to the CPV duty cycle reaching 100%, with all engine cylinders activated to combust air and fuel, the resulting vacuum applied on the fuel system and evaporative emissions system may be understood to be sufficient to reduce the fuel vaporization rate to below the predetermined fuel vaporization threshold rate. Accordingly, at 535, method 500 may include maintaining the CPV fully open and maintaining the CVV fully open. Proceeding to 540, method 500 may include indicating whether canister load is below the predetermined threshold loading state. If not, method 500 may return to 535, where purging of the canister may continue via maintaining the CPV fully open. In response to canister loading state being indicated to have decrease to below the predetermined threshold loading state at 540, method 500 may proceed to 545. At 545, method 500 may include discontinuing the purging operation by commanding closed the CPV. At 550, method 500 may include updating vehicle operating parameters to reflect the purging operation. Similar to that discussed above, at 550, method 500 may include updating the current canister loading state, and updating a canister purge schedule to reflect the purging event. Based on driver demand, one or more engine cylinders may be deactivated responsive to conditions being met for doing so. Method 500 may then end.

Returning to 530, in response to the fuel vaporization rate continuing to remain above the predetermined fuel vaporization threshold rate, method 500 may proceed to 555. At 555, method 500 may include duty cycling the CVV. In other words, rather than maintaining the CVV fully open, the CVV may be periodically closed to seal the vent line from atmosphere. As discussed above with regard to FIGS. 3A-3B, duty cycling the CVV while engine manifold vacuum is being communicated to the fuel system and evaporative emissions system may result in the vacuum being preferentially directed to the fuel tank, as the path through the entirety of the canister becomes more restrictive as a function of the CVV duty cycle. In directing the vacuum at the fuel tank, it may be understood that the fuel vapors stemming from the fuel tank as a result of the high fuel vaporization rate, may be more effectively routed to engine intake rather than contributing the further loading of the canister, and which may thus reduce the fuel vaporization rate to below the predetermined fuel vaporization threshold rate. In some examples, the CVV may be duty cycled initially at a predetermined rate, and then ramped up over time so that the CVV spends more and more time in the closed state. The ramping of the CVV to spend more and more time in the closed state may be a function of engine stability, or in other words, CVV duty cycle may be controlled to avoid engine hesitation and/or stall. The CVV may be additionally or alternatively duty cycled at a rate that is a function of the fuel vaporization rate. For example, as the fuel vaporization rate increases, the amount of time the CVV is maintained closed may be increased. Similarly, as the fuel vaporization rate decreases, the amount of time the CVV is maintained closed may decrease. However the CVV is controlled, it may be understood that the goal of duty cycling the CVV is to effectively reduce the fuel vaporization rate to below the predetermined fuel vaporization threshold rate, such that purging efficiency may be increased.

Accordingly, with the CVV being duty cycled rather than maintained fully open without periodically closing the CVV, method 500 may proceed to 560. At 560, method 500 may include indicating whether the fuel vaporization rate has decreased to below the predetermined fuel vaporization rate threshold as a result of the CVV being duty cycled. If the fuel vaporization rate remains above the predetermined fuel vaporization threshold rate, method 500 may return to 555, where the duty cycle of the CVV may be altered so that the CVV spends a greater proportion of time in the closed state (while also avoiding engine hesitation and/or stall), thus increasing the restriction in the vent line coupling the canister to atmosphere. In this way, the CVV may be controlled to direct a greater and greater amount of vacuum at the fuel tank, in order to reduce the fuel vaporization rate to below the predetermined fuel vaporization threshold rate.

If, at 560, it is indicated that the fuel vaporization rate has decreased to below the predetermined fuel vaporization rate, then method 500 may proceed to 565. At 565, method 500 may include commanding fully open the CVV, such that the vacuum stemming from the intake manifold may preferentially directed at the canister as opposed to the fuel tank. Proceeding to 570, method 500 may include indicating whether canister load is below the predetermined threshold loading state. If not, purging may continue at 565. Alternatively, responsive to the canister load being indicated to be below the predetermined threshold loading state, method 500 may proceed to 545, where purging may be discontinued by commanding closed the CPV. Proceeding to 550, method 500 may include updating vehicle operating parameters to reflect the purging event. As discussed above, updating vehicle operating parameters may include updating the canister loading state, and may include updating a purge schedule to reflect the recent purging event. In some examples, one or more engine cylinders may be deactivated depending on whether conditions are met for doing so. Method 500 may then end.

Thus, discussed herein, a method may comprise reactivating one or more cylinders of an engine while a fuel vapor storage canister positioned in an evaporative emissions control system of a vehicle is being purged of stored fuel vapors in response to an indication that the purging of stored fuel vapors is compromised as a result of fuel vaporization stemming from a fuel tank positioned in a fuel system coupled to the evaporative emissions system.

In such a method, reactivating the one or more cylinders may further comprise providing fuel and spark to the one or more cylinders, and reactivating one or more intake and exhaust valves coupled to the one or more cylinders.

In such a method, reactivating the one or more cylinders may increase a negative pressure applied on the fuel system and the evaporative emissions system, for reducing the fuel vaporization.

In such a method, the fuel vaporization may be inferred as a function of one or more of a pressure in the fuel system, output of a hydrocarbon sensor positioned in a vent line coupling the fuel vapor storage canister to atmosphere and/or a temperature of the fuel vapor storage canister as monitored via one or more canister temperature sensor(s).

In such a method, the engine may comprise a variable displacement engine.

In such a method, purging of the stored fuel vapors being compromised as the result of the fuel vaporization may comprise an indication that the fuel vapor storage canister is being loaded with fuel vapors at a rate that is greater than another rate at which the fuel vapor storage canister is being purged of the stored fuel vapors.

In such a method, the method may further comprise increasing a duty cycle of a canister purge valve positioned in a purge line that couples the fuel vapor storage canister to the engine, during the purging.

In such a method, the method may further comprise maintaining a desired engine air-fuel ratio during the purging in response to reactivating the one or more cylinders.

In such a method, reactivating the one or more cylinders may be controlled to minimize a fuel economy penalty incurred by reactivating the one or more cylinders.

In such a method, the method may further comprise in response to all cylinders of the engine being reactivated during the purging and where the purging of the stored fuel vapors remains compromised as the result of the fuel vaporization, increasing a restriction between the fuel vapor storage canister and atmosphere to reduce the fuel vaporization.

Another example of a method may comprise reactivating a deactivated engine cylinder while purging a fuel vapor canister of fuel vapors to an engine in response to fuel tank vapor generation greater than a threshold level, and continuing the purging to the engine.

In such a method, reactivating the deactivated engine cylinder may reduce the fuel tank vapor generation to below the threshold level.

In such a method, reactivating the deactivated engine cylinder may further comprise providing the deactivated engine cylinder with fuel and spark, and reactivating intake and exhaust valves coupled to the deactivated engine cylinder to open and close as a function of engine cycle.

In such a method, the method may further comprise in response to all cylinders of the engine combusting air and fuel, and further in response to an indication that a canister purge valve positioned in a purge line that couples the fuel vapor canister to the engine is fully open without periodically closing and where the fuel tank vapor generation remains greater than the threshold level, duty cycling a canister vent valve positioned in a vent line that couples the fuel vapor canister to atmosphere. In response to the fuel tank vapor generation dropping to below the threshold level, the method may include commanding fully open the canister vent valve without periodically closing the canister vent valve, to route the stored fuel vapors from the fuel vapor canister to the engine for combustion.

In such a method, under conditions where the fuel tank vapor generation is greater than the threshold level, the fuel vapor canister is being loaded with fuel vapors at a faster rate than the fuel vapors are being purged to the engine.

Another example of a method comprises during a purging event of a fuel vapor storage canister positioned in an evaporative emissions system of a vehicle, the purging event for routing stored fuel vapors from the fuel vapor storage canister to an engine for combustion, inferring that a rate of fuel vaporization stemming from a fuel tank of the vehicle is greater than a predetermined fuel vaporization threshold rate, and reactivating one or more cylinders of the engine that are deactivated, to increase a purging efficiency of the fuel vapor storage canister.

In such a method, increasing the purging efficiency may further comprise reducing the rate of fuel vaporization to below the predetermined fuel vaporization threshold rate.

In such a method, reactivating the one or more cylinders of the engine may further comprise providing the one or more cylinders of the engine with fuel and spark, and reactivating intake and exhaust valves coupled to the one or more cylinders to open and close as a function of engine cycle.

In such a method, the method may further comprise in response to all cylinders of the engine combusting air and fuel, and further in response to an indication that a canister purge valve positioned in a purge line that couples the fuel vapor storage canister to the engine if fully open without periodically closing and where the rate of fuel vaporization remains greater than the predetermined fuel vaporization threshold rate: duty cycling a canister vent valve positioned in a vent line that couples the fuel vapor storage canister to atmosphere; and in response to the rate of fuel vaporization dropping to below the predetermined fuel vaporization threshold rate, commanding fully open the canister vent valve without periodically closing the canister vent valve, to route the stored fuel vapors from the fuel vapor storage canister to the engine for combustion.

In such a method, under conditions where the rate of fuel vaporization is greater than the predetermined fuel vaporization threshold rate, it may be understood that the fuel vapor storage canister is being loaded with fuel vapors from the fuel tank at a faster rate than the stored fuel vapors are being purged to the engine.

Turning now to FIG. 6, an example timeline 600 is shown, depicting a canister purging event conducted in accordance with the methodology depicted at FIGS. 4-5. Example timeline 600 includes plot 605, indicating whether canister purging conditions are met (yes or no), over time. Timeline 600 further includes plot 610, indicating a status of the CPV (fully open or fully closed), over time. Timeline 600 further includes plot 615, indicating a number of cylinders which are combusting air and fuel, over time. In this example, it may be understood that the engine has four cylinders, and that one of the four cylinders may be combusting air and fuel (1:4), while the other three are deactivated, or in other words are being operated in VDE mode. Alternatively, two of the four cylinders may be combusting air and fuel (2:4), while the other two are deactivated. Alternatively, three of the four cylinders may be combusting air and fuel (3:4), while the other cylinder is deactivated. Still further, all four of the cylinders may be combusting air and fuel (4:4), with no deactivated cylinders. Timeline 600 further includes plot 620, indicating a status (fully open or fully closed) of the CVV. Timeline 600 further includes plot 625, indicating a fuel vaporization rate of fuel in the fuel tank, as discussed in detail above. Fuel vaporization rate may increase (+), or may decrease (−), over time. Timeline 600 further includes plot 630, indicating a canister loading state, over time. Canister loading state may increase (+) or may decrease (−), over time. In this example timeline, it may be understood that the vehicle system does not include an FTIV.

At time t0, conditions are not indicated to be met for purging the canister (plot 605). Accordingly, the CPV is closed (plot 610), and the CVV is open (plot 620). The vehicle is being operated in the VDE mode of operation, where at time t0 only one cylinder is activated, or combusting air and fuel, while the other three cylinders are deactivated with respective intake and exhaust valves closed (refer to plot 615). A fuel vaporization rate is high (plot 625), and canister load is also high (plot 630). As discussed above, it may be understood that fuel vaporization rate may be indicated as a function of pressure in the fuel system as monitored via the FTPT (e.g. 23), based on output from one or more temperature sensor(s) (e.g. 97) positioned in the canister near the vent line, and/or via output from the hydrocarbon sensor (e.g. 120) positioned in the vent line stemming from the canister.

At time t1, conditions are indicated to be met for purging the canister (plot 605). Accordingly, at time t2 the CPV is commanded to an initial, or first duty cycle (plot 610). Between time t2 and t3, fuel vaporization rate (plot 625) is greater than the predetermined fuel vaporization threshold rate, depicted as dashed line 626. In other words, at the initial duty cycle of the CPV (plot 610), the vacuum applied on the fuel system and evaporative emissions system is not effectively purging the canister, but rather the canister is being loaded at a rate that is greater than that which the canister is being purged of fuel vapors.

Accordingly, at time t3, the controller commands a cylinder of the engine to be reactivated to combust air and fuel in order to increase the vacuum applied on the fuel system and evaporative emissions system. The determination via the controller to reactivate a single cylinder of the engine may be a function of one or more of the current fuel vaporization rate in relation to the predetermined fuel vaporization threshold rate, an inferred increase in vacuum that may result from the reactivation of the engine cylinder at the current duty cycle of the CPV, an assessment of fuel economy penalty which may be incurred by reactivating the cylinder as a function of the current fuel vaporization rate, and current level at which undesired evaporative emissions are escaping to atmosphere. For example, in some cases it may be more beneficial from a fuel economy standpoint to continue increasing the CPV duty cycle without also relying on reactivation of one or more engine cylinders, in order to reduce the fuel vaporization rate to the point where the canister is being efficiently purged of fuel vapors. However, in other examples, such as the example depicted at timeline 600, engine control strategy may infer that, in terms of tradeoff between fuel economy and release of undesired evaporative emissions to atmosphere, it is desirable to reactivate one or more engine cylinders concurrent with the CPV being ramped up in duty cycle. It may be understood that, in ramping up CPV duty cycle and/or reactivating engine cylinders, engine control strategy may compensate for the expected increase in fuel vapors inducted to the engine by adjusting timing and/or amount of fuel provided to the activated cylinders, and/or by adjusting timing of spark provided to the activated cylinders. In other words, it may be understood that air-fuel ratio may be controlled based on a learned amount of fuel vapors being inducted to the engine, and may further be controlled as a function of an inferred increase in fuel vapor concentration expected to be inducted to the engine upon increase in CPV duty cycle and/or cylinder(s) reactivation. The inferred increase in fuel vapor concentration may be a function of at least the current learned amount of fuel vapors being inducted to the engine, an expected vacuum increase applied on the fuel system and evaporative emissions system due to the increase in CPV duty cycle and/or cylinder(s) reactivation, and the current fuel vaporization rate. It may also be understood that CPV duty cycle increase and/or number of cylinder(s) reactivated may controlled so as to avoid potential for engine hesitation and/or stall events due to induction of an amount of fuel vapors to the engine which may cause engine hesitation and/or stall.

As indicated between time t3 and t4, reactivation of the single engine cylinder did not result in a substantial decrease in fuel vaporization rate (plot 625). Thus, at time t4, engine control strategy determines that it is desirable from a fuel economy standpoint and from the standpoint of reducing or avoiding release of undesired evaporative emissions to atmosphere, to reactivate another engine cylinder (plot 615). Furthermore, based on the learned concentration of fuel vapors being inducted into the engine, at time t5 CPV duty cycle is increased to a second rate. However, with three engine cylinders activated to combust air and fuel, and with the CPV being duty cycled at the second rate, fuel vaporization rate is not substantially reduced (plot 625).

Thus, at time t6, the last deactivated cylinder is reactivated (plot 615), such that all engine cylinders are combusting air and fuel. Yet even so, between time t6 and t7, with all engine cylinders combusting air and fuel and with the CPV being duty cycled at the second rate, fuel vaporization remains substantially unchanged. CPV duty cycle is increased to a third rate at time t7, and is accompanied by a slight reduction in fuel vaporization rate. However, as can be seen at plot 630, even with the action taken prior to time t8, canister load has not substantially decreased, and thus the desired action of purging of the canister is not being effectively accomplished due to the fuel vaporization rate being above the predetermined fuel vaporization threshold rate.

At time t8, CPV duty cycle is increased again, to a 100% duty cycle or in other words, the CPV is commanded fully open and is held open without periodic closing of the valve.

With all engine cylinders activated and the CPV commanded fully open, fuel vaporization rate remains above the predetermined fuel vaporization threshold rate (plot 625), and consistent with this, canister load remains substantially constant (plot 630). Accordingly, further mitigating action is undertaken under the control of the vehicle controller. Specifically, at time t9, the CVV is commenced being duty cycled, in an attempt to actively direct vacuum stemming from the intake manifold in the direction of the fuel tank, rather than through the entirety of the canister. In other words, referring back to FIG. 3B, by increasing a restriction between the canister and atmosphere by duty cycling the CVV, intake manifold vacuum may be actively preferentially applied on the fuel tank via the first loop (e.g. 357), as opposed to being applied on the entirety of the canister via the second loop (e.g. 358). In this way, fuel tank fuel vapors emanating from the fuel tank due to the high fuel vaporization rate may be routed to the engine for combustion rather than to the canister, which may serve to effectively reduce the fuel vaporization rate to the point where the canister may be effectively purged.

Thus, between time t9 and t10, fuel vaporization rate is indicated to decrease (plot 625), but does not decrease to below the predetermined fuel vaporization threshold rate. Accordingly, at time t10, duty cycle of the CVV is commanded to be such that the CVV is closed for a greater proportion of time than that depicted between time t9 and t10. However, while fuel vaporization rate continues to decline between time t10 and t11, the fuel vaporization rate still does not decline to below the predetermined fuel vaporization threshold rate, and thus at time t11 the CVV duty cycle is once again commanded to a new duty cycle, the duty cycle comprising a duty cycle where the CVV is closed for an even greater proportion of time as compared to between time t10 and t11. With the CVV being duty cycled as such between time t11 and t12, fuel vaporization rate decreases to below the predetermined fuel vaporization threshold rate. With the fuel vaporization rate having been decreased to below the predetermined fuel vaporization threshold rate, at time t12 the CVV is commanded fully open, and in this way the vacuum stemming from the intake manifold is directed primarily through the entirety of the canister, as the path through the canister has become the path of least resistance for the applied vacuum. Accordingly, between time t12 and t13, with the fuel vaporization rate below the predetermined fuel vaporization threshold rate and with the CVV commanded fully open, canister load decreases and just after time t13, the canister loading state is indicated to be clean, or in other words the canister loading state is indicated to have reached the predetermined threshold loading state. While the depicted example illustrates the CVV being commanded fully open in response to the fuel vaporization rate dropping below the predetermined fuel vaporization threshold rate, it may be understood that in other example the CVV may be maintained at a current duty cycle, or may be periodically changed to occupy the fully open position more and more per opening event, rather than being simply commanded open. In this way, a balance may be struck between fuel vaporization and purging, for effective purging of the canister. For example, there may be circumstances where, in response to the CVV being commanded fully open in response to fuel vaporization dropping below the fuel vaporization threshold, fuel vaporization may once again commence, which may then require further mitigating action in the form of CVV control. Thus, in such circumstances, which may include indications of one or more of current fuel temperature and/or ambient temperature, rather than commanding open the CVV in response to the fuel vaporization rate dropping below the predetermined fuel vaporization threshold rate, CVV duty cycle may be controlled to maintain the fuel vaporization rate below the predetermined fuel vaporization threshold rate, while also enabling efficient purging of the canister.

In this way, under conditions where fuel vaporization rate of fuel in a fuel tank that is coupled to an evaporative emissions system is such that intake manifold vacuum is not capable of effectively purging a canister positioned in the evaporative emissions system, mitigating action may be taken to reduce the fuel vaporization rate to a point where the canister may effectively be purged of stored fuel vapors. In this way, release of undesired evaporative emissions to atmosphere may be reduced or avoided. Furthermore, in taking the mitigating action to reduce the fuel vaporization rate during a canister purging operation, engine control strategy may take the most appropriate action to reduce fuel economy penalty. In other words, engine control strategy may strike a balance between fuel economy and release of undesired evaporative emissions to atmosphere. In this way, mitigating action may be taken which minimizes impacts to fuel economy while effectively reducing opportunity for release of undesired evaporative emissions to atmosphere, while also achieving the desired result of effectively purging the canister.

The technical effect is to recognize that engine control strategy may infer an appropriate time to reactivate one or more engine cylinders that are being operated in a VDE mode, as a function of at least one or more of fuel economy penalty, fuel vaporization rate in relation to the predetermined fuel vaporization threshold rate, desire to reduce or avoid release of undesired evaporative emissions to atmosphere, and/or in relation to a purge ramp as defined by a sequential increase in CPV duty cycle over a course of a canister purging event. By coordinating engine cylinder reactivation during a purging event under situations where fuel vaporization is preventing or reducing an effectiveness of the canister purging operation, the effectiveness or efficiency of purging may be increased. Such a technical effect may be particularly advantageous for hybrid electric vehicles with limited engine run time, as opportunities for purging in such vehicle systems are limited and thus it may be desirable for any opportunity to purge the canister to be conducted in such a way as to effectively clean the canister of stored fuel vapors so that potential release of undesired evaporative emissions to atmosphere may be reduced or avoided as much as possible.

A further technical effect is to recognize that there may be circumstances where reactivation of engine cylinder(s) and/or increasing of a duty cycle of the CPV may still not be sufficient to effectively purge the canister, where such circumstances include fuel vaporization that is loading the canister at a rate faster than a rate at which vapors stored at the canister are being purged to engine intake. Thus, a further technical effect includes recognizing that, under such circumstances, by increasing a restriction (e.g. duty cycling the CVV) in the vent line coupling the evaporative emissions system to atmosphere, intake manifold vacuum may be actively preferentially directed at the fuel tank as opposed to the entirety of the canister. In directing the intake manifold vacuum preferentially at the fuel tank, fuel vapors stemming from the fuel tank may be preferentially routed to engine intake for combustion rather than to the canister for storage. In this way, fuel vaporization rate may be reduced to a point where purging of the canister is effective, at which point the restriction in the vent line may be removed (e.g. CVV commanded fully open), so that fuel vapors may be effectively purged from the canister to engine intake. Such action may improve overall fuel economy by combusting the stored vapors rather than allowing the stored vapors to be released to atmosphere, and in turn may reduce release of undesired evaporative emissions to atmosphere.

The systems depicted herein, and with reference to FIGS. 1-2, along with the methods depicted herein, and with regard to FIGS. 4-5, may enable one or more systems and one or more methods. In one example, a method comprises reactivating one or more cylinders of an engine while a fuel vapor storage canister positioned in an evaporative emissions control system of a vehicle is being purged of stored fuel vapors in response to an indication that the purging of stored fuel vapors is compromised as a result of fuel vaporization stemming from a fuel tank positioned in a fuel system coupled to the evaporative emissions system. In a first example of the method, the method further includes wherein reactivating the one or more cylinders further comprises providing fuel and spark to the one or more cylinders, and reactivating one or more intake and exhaust valves coupled to the one or more cylinders. A second example of the method optionally includes the first example, and further includes wherein reactivating the one or more cylinders increases a negative pressure applied on the fuel system and the evaporative emissions system, for reducing the fuel vaporization. A third example of the method optionally includes any one or more or each of the first through second examples, and further includes wherein the fuel vaporization is inferred as a function of one or more of a pressure in the fuel system, output of a hydrocarbon sensor positioned in a vent line coupling the fuel vapor storage canister to atmosphere and/or a temperature of the fuel vapor storage canister as monitored via one or more canister temperature sensor(s). A fourth example of the method optionally includes any one or more or each of the first through third examples, and further includes wherein the engine comprises a variable displacement engine. A fifth example of the method optionally includes any one or more or each of the first through fourth examples, and further includes wherein the purging of the stored fuel vapors being compromised as the result of the fuel vaporization comprises an indication that the fuel vapor storage canister is being loaded with fuel vapors at a rate that is greater than another rate at which the fuel vapor storage canister is being purged of the stored fuel vapors. A sixth example of the method optionally includes any one or more or each of the first through fifth examples, and further comprises increasing a duty cycle of a canister purge valve positioned in a purge line that couples the fuel vapor storage canister to the engine, during the purging. A seventh example of the method optionally includes any one or more or each of the first through sixth examples, and further comprises maintaining a desired engine air-fuel ratio during the purging in response to reactivating the one or more cylinders. An eighth example of the method optionally includes any one or more or each of the first through seventh examples, and further includes wherein reactivating the one or more cylinders is controlled to minimize a fuel economy penalty incurred by reactivating the one or more cylinders. A ninth example of the method optionally includes any one or more or each of the first through eighth examples, and further comprises in response to all cylinders of the engine being reactivated during the purging and where the purging of the stored fuel vapors remains compromised as the result of the fuel vaporization, increasing a restriction between the fuel vapor storage canister and atmosphere to reduce the fuel vaporization.

Another example of a method comprises reactivating a deactivated engine cylinder while purging a fuel vapor canister of fuel vapors to an engine in response to fuel tank vapor generation greater than a threshold level; and continuing the purging to the engine. In a first example of the method, the method further includes wherein reactivating the deactivated engine cylinder is to reduce the fuel tank vapor generation to below the threshold level. A second example of the method optionally includes the first example, and further includes wherein reactivating the deactivated engine cylinder further comprises providing the deactivated engine cylinder with fuel and spark, and reactivating intake and exhaust valves coupled to the deactivated engine cylinder to open and close as a function of engine cycle. A third example of the method optionally includes any one or more or each of the first through second examples, and further comprises in response to all cylinders of the engine combusting air and fuel, and further in response to an indication that a canister purge valve positioned in a purge line that couples the fuel vapor canister to the engine is fully open without periodically closing and where the fuel tank vapor generation remains greater than the threshold level: duty cycling a canister vent valve positioned in a vent line that couples the fuel vapor canister to atmosphere; and in response to the fuel tank vapor generation dropping to below the threshold level, commanding fully open the canister vent valve without periodically closing the canister vent valve, to route the stored fuel vapors from the fuel vapor canister to the engine for combustion. A fourth example of the method optionally includes any one or more or each of the first through third examples, and further includes wherein under conditions where the fuel tank vapor generation is greater than the threshold level, the fuel vapor canister is being loaded with fuel vapors at a faster rate than the fuel vapors are being purged to the engine.

An example of a system for a vehicle comprises a fuel vapor storage canister positioned in an evaporative emissions system of the vehicle, the evaporative emissions system fluidically coupled to atmosphere via a canister vent valve, fluidically coupled to an engine via a canister purge valve, and fluidically coupled to a fuel tank positioned in a fuel system of the vehicle; and a controller with computer readable instructions stored on non-transitory memory that when executed, cause the controller to: conduct a purging operation of the fuel vapor storage canister by duty cycling the canister purge valve with the canister vent valve fully open; and in response to an indication that a rate of fuel vaporization stemming from the fuel tank is greater than a predetermined fuel vaporization threshold rate during the purging operation of the fuel vapor storage canister, reactivate one or more cylinders of the engine to combust air and fuel, thereby reducing the rate of the fuel vaporization and increasing an efficiency of the purging operation. In a first example of the system, the system further includes wherein the engine comprises a variable displacement engine; and wherein the controller stores further instructions to reactivate the one or more engine cylinders by resuming providing fuel and spark to the one or more cylinders, and resuming operation of one or more intake and exhaust valve(s) coupled to the one or more engine cylinders. A second example of the system optionally includes the first example, and further includes wherein the controller stores further instructions to sequentially increase a duty cycle of the canister purge valve during the purging operation. A third example of the system optionally includes any one or more or each of the first through second examples, and further includes wherein the controller stores further instructions to, in response to all engine cylinders combusting air and fuel, and further responsive to the rate of fuel vaporization remaining greater than the predetermined fuel vaporization threshold rate, controlling a duty cycle of the canister vent valve in order to direct a negative pressure stemming from the engine preferentially at the fuel tank instead of an entirety of the fuel vapor canister, to reduce the rate of fuel vaporization to below the predetermined fuel vaporization threshold rate. A fourth example of the method optionally includes any one or more or each of the first through third examples, and further comprises one or more of a fuel tank pressure transducer, a hydrocarbon sensor positioned in a vent line that couples the evaporative emissions system to atmosphere, and/or one or more temperature sensor(s) positioned in the fuel vapor storage canister near the vent line; and wherein the controller stores further instructions to infer the fuel vaporization rate based on one or more of a fuel tank pressure transducer output, a hydrocarbon sensor output, and/or a temperature sensor output.

In another embodiment, a method comprises monitoring a fuel vaporization rate stemming from a fuel tank of a vehicle, and in response to the fuel vaporization rate being greater than a predetermined fuel vaporization threshold rate, and further in response to a request for purging of a fuel vapor storage canister, reactivating one or more deactivated engine cylinders prior to (e.g. within a threshold duration such as within 20 seconds or less) initiating the purging of the fuel vapor storage canister. As one example, reactivating one or more deactivated cylinders may be a function of a relationship between the fuel vaporization rate and the predetermined fuel vaporization threshold rate. For example, the greater the difference between the fuel vaporization rate and the predetermined fuel vaporization rate, the more engine cylinders may be reactivated prior to initiating the purging event. In some examples, all deactivated engine cylinders may be reactivated prior to (e.g. within the threshold duration, such as within 20 seconds or less) the purging event, or one or more may be reactivated. The number of engine cylinders reactivated prior to the purging event may comprise a number whereby it may be expected that the fuel vaporization rate will be reduced to below the predetermined fuel vaporization threshold rate upon initiation of the purging event, such that the canister may be effectively cleaned. Thus, a controller may assess an inferred increase in vacuum which may be imparted on the fuel tank and/or fuel vapor canister by reactivation of one or more deactivated engine cylinders, and may then select to reactivate the particular number of engine cylinders expected to increase the vacuum during the purging to a level where the fuel vaporization rate is reduced to below the predetermined fuel vaporization threshold rate. In the event that the reactivation of the selected number of cylinders does not result in the fuel vaporization rate being reduced to below the predetermined fuel vaporization threshold rate upon initiation of the purging of the canister, then further mitigating action may be taken which may include reactivating any cylinders which remain deactivated, and/or ramping up a duty cycle of a canister purge valve. In response to all cylinders being activated, and the canister purge valve duty reaching 100%, the controller may command the CVV duty cycled to spend time in a fully closed state, to increase an amount of vacuum directed at the fuel tank as compared to an entirety of the canister, with the goal of reducing the fuel vaporization rate to below the predetermined fuel vaporization rate threshold, such that efficient canister purging may result. In an example where the CVV is duty cycled, the CVV may be controlled to spend more and more time in the closed state, to effectively reduce the fuel vaporization rate to below the predetermined fuel vaporization threshold rate.

In yet another embodiment, in response to a request for purging a fuel vapor canister where one or more cylinders of an engine are deactivated and where, upon initiation of the purging event it is indicated that a fuel vaporization rate is greater than a predetermined fuel vaporization threshold rate, duty cycling a canister vent valve to reduce the fuel vaporization rate to below the predetermined fuel vaporization threshold rate, while maintaining the one or more engine cylinders deactivated. If, upon duty cycling the canister vent valve, the fuel vaporization rate is not reduced to below the predetermined fuel vaporization threshold rate and/or if issues related to combustion instability arise, then one or more of the deactivated cylinders may be reactivated. Such methodology may in some examples be concurrent with a ramping over time of a duty cycle of a canister purge valve. By first duty cycling the CVV instead of attempting to reactivate engine cylinders, fuel vaporization may be controlled, without sacrificing fuel economy. In some examples, the CVV may be commenced being duty cycled once the canister purge valve duty cycle as reached 100%, whereas in other examples the CVV may be commenced being duty cycled during or concurrent with the ramping up of the canister purge valve duty cycle in a direction of 100% duty cycle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
reactivating one or more cylinders of an engine and duty cycling a canister vent valve positioned in a vent line that couples a fuel vapor storage canister to atmosphere while the fuel vapor storage canister positioned in an evaporative emissions control system of a vehicle is being purged of stored fuel vapors in response to an indication that purging of stored fuel vapors is compromised as a result of fuel vaporization stemming from a fuel tank positioned in a fuel system coupled to the evaporative emissions system.

2. The method of claim 1, wherein reactivating the one or more cylinders further comprises providing fuel and spark to the one or more cylinders, and reactivating one or more intake and exhaust valves coupled to the one or more cylinders.

3. The method of claim 1, wherein reactivating the one or more cylinders increases a negative pressure applied on the fuel system and the evaporative emissions system, for reducing the fuel vaporization.

4. The method of claim 1, wherein the fuel vaporization is inferred as a function of one or more of a pressure in the fuel system, output of a hydrocarbon sensor positioned in a vent line coupling the fuel vapor storage canister to atmosphere, and/or a temperature of the fuel vapor storage canister as monitored via one or more canister temperature sensor(s).

5. The method of claim 1, wherein the engine comprises a variable displacement engine.

6. The method of claim 1, wherein the purging of the stored fuel vapors being compromised as the result of the fuel vaporization comprises an indication that the fuel vapor storage canister is being loaded with fuel vapors at a rate that is greater than another rate at which the fuel vapor storage canister is being purged of the stored fuel vapors.

7. The method of claim 1, further comprising increasing a duty cycle of a canister purge valve positioned in a purge line that couples the fuel vapor storage canister to the engine, during the purging.

8. The method of claim 1, further comprising maintaining a desired engine air-fuel ratio during the purging in response to reactivating the one or more cylinders.

9. The method of claim 1, wherein reactivating the one or more cylinders is controlled to minimize a fuel economy penalty incurred by reactivating the one or more cylinders.

10. The method of claim 1, further comprising:
in response to all cylinders of the engine being reactivated during the purging and where the purging of the stored fuel vapors remains compromised as the result of the fuel vaporization, increasing a restriction between the fuel vapor storage canister and atmosphere to reduce the fuel vaporization.

11. A method comprising:
reactivating a deactivated engine cylinder and duty cycling a canister vent valve positioned in a vent line that couples the fuel vapor canister to atmosphere while purging a fuel vapor canister of fuel vapors to an engine in response to fuel tank vapor generation greater than a threshold level; and
continuing the purging to the engine.

12. The method of claim 11, wherein reactivating the deactivated engine cylinder is to reduce the fuel tank vapor generation to below the threshold level.

13. The method of claim 11, wherein reactivating the deactivated engine cylinder further comprises providing the deactivated engine cylinder with fuel and spark, and reactivating intake and exhaust valves coupled to the deactivated engine cylinder to open and close as a function of engine cycle.

14. The method of claim 11, further comprising:
duty cycling the canister vent valve in response to all cylinders of the engine combusting air and fuel, and further in response to an indication that a canister purge valve positioned in a purge line that couples the fuel vapor canister to the engine is fully open without periodically closing and where the fuel tank vapor generation remains greater than the threshold level; and in response to the fuel tank vapor generation dropping to below the threshold level, commanding fully open the canister vent valve without periodically closing the canister vent valve, to route the stored fuel vapors from the fuel vapor canister to the engine for combustion.

15. The method of claim 11, wherein under conditions where the fuel tank vapor generation is greater than the threshold level, the fuel vapor canister is being loaded with fuel vapors at a faster rate than the fuel vapors are being purged to the engine.

16. A system for a vehicle, comprising:
 a fuel vapor storage canister positioned in an evaporative emissions system of the vehicle, the evaporative emissions system fluidically coupled to atmosphere via a canister vent valve, fluidically coupled to an engine via a canister purge valve, and fluidically coupled to a fuel tank positioned in a fuel system of the vehicle; and
 a controller with computer readable instructions stored on non-transitory memory that when executed, cause the controller to:
  conduct a purging operation of the fuel vapor storage canister by duty cycling the canister purge valve with the canister vent valve fully open; and
  in response to an indication that a rate of fuel vaporization stemming from the fuel tank is greater than a predetermined fuel vaporization threshold rate during the purging operation of the fuel vapor storage canister, reactivate one or more cylinders of the engine to combust air and fuel and control a duty cycle of the canister vent valve in order to direct a negative pressure stemming from the engine, preferentially at the fuel tank instead of an entirety of the fuel vapor canister, thereby reducing the rate of the fuel vaporization and increasing an efficiency of the purging operation.

17. The system of claim 16, wherein the engine comprises a variable displacement engine; and
 wherein the controller stores further instructions to reactivate the one or more engine cylinders by resuming providing fuel and spark to the one or more cylinders, and resuming operation of one or more intake and exhaust valve(s) coupled to the one or more engine cylinders.

18. The system of claim 16, wherein the controller stores further instructions to sequentially increase a duty cycle of the canister purge valve during the purging operation.

19. The system of claim 16, wherein controlling a duty cycle of the canister vent valve is responsive to all engine cylinders combusting air and fuel, and further responsive to the rate of fuel vaporization remaining greater than the predetermined fuel vaporization threshold rate, to reduce the rate of fuel vaporization to below the predetermined fuel vaporization threshold rate.

20. The system of claim 16, further comprising one or more of a fuel tank pressure transducer, a hydrocarbon sensor positioned in a vent line that couples the evaporative emissions system to atmosphere, and/or one or more temperature sensor(s) positioned in the fuel vapor storage canister near the vent line; and
 wherein the controller stores further instructions to infer the fuel vaporization rate based on one or more of a fuel tank pressure transducer output, a hydrocarbon sensor output, and/or a temperature sensor output.

* * * * *